United States Patent
Pyun et al.

(10) Patent No.: US 9,934,420 B2
(45) Date of Patent: Apr. 3, 2018

(54) FINGERPRINT INFORMATION PROCESSING METHOD AND APPARATUS FOR SPEED IMPROVEMENT OF FINGERPRINT REGISTRATION AND AUTHENTICATION

(71) Applicants: Crucialtec Co., Ltd., Seongnam-si (KR); Canvasbio Co., Ltd., Seongnam-si (KR)

(72) Inventors: Baek Bum Pyun, Seoul (KR); Woo Taek Lim, Seoul (KR); Eun Kyung Ma, Suwon-si (KR)

(73) Assignees: CRUCIALTEC CO., LTD., Seongnam-si (KR); CANVASBIO CO., LTD., Seongnam-si (KR)

( * ) Notice: Subject to any disclaimer, the term of this patent is extended or adjusted under 35 U.S.C. 154(b) by 7 days.

(21) Appl. No.: 15/286,812

(22) Filed: Oct. 6, 2016

(65) Prior Publication Data

US 2017/0103253 A1   Apr. 13, 2017

(30) Foreign Application Priority Data

Oct. 7, 2015   (KR) .................. 10-2015-0141239

(51) Int. Cl.

| | |
|---|---|
| *G06K 9/00* | (2006.01) |
| *G06T 7/60* | (2017.01) |
| *G06K 9/52* | (2006.01) |
| *G06K 7/00* | (2006.01) |
| *G06K 9/46* | (2006.01) |
| *G06T 7/00* | (2017.01) |

(52) U.S. Cl.
CPC ....... *G06K 9/00087* (2013.01); *G06K 9/4661* (2013.01); *G06K 9/4671* (2013.01); *G06K 9/52* (2013.01); *G06T 7/0081* (2013.01); *G06T 7/60* (2013.01); *G06K 2009/4666* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 7,310,434 B2 * | 12/2007 | Shigeta .................. | H04N 5/365 348/E5.081 |
| 9,779,278 B2 * | 10/2017 | Nilsson ................ | G06K 9/0002 |
| 2009/0087043 A1 * | 4/2009 | Mizushima ........ | G06K 9/00013 382/124 |

(Continued)

*Primary Examiner* — Bobbak Safaipour
(74) *Attorney, Agent, or Firm* — H.C. Park & Associates, PLC

(57) ABSTRACT

A fingerprint information processing method and apparatus in which the method includes: obtaining a fingerprint image; calculating an average value of shading values of pixels in a specific region based on a pixel with respect to each pixel of the fingerprint image, performing a first processing of calculating a sum of average values of shading values of pixels included in an expanded region while gradually expanding the specific region, and generating a first processing image for the fingerprint image using a first processing-performed value for each pixel; and forming a window including a predetermined region in the first processing image, and selecting feature points among pixels in a window region while moving the window.

9 Claims, 10 Drawing Sheets

(56) References Cited

U.S. PATENT DOCUMENTS

| | | | |
|---|---|---|---|
| 2012/0106808 A1* | 5/2012 | Morioka | G06K 9/0008 |
| | | | 382/125 |
| 2013/0100267 A1* | 4/2013 | Baek | G06K 9/00067 |
| | | | 348/77 |
| 2013/0136327 A1* | 5/2013 | Kamei | A61B 5/117 |
| | | | 382/128 |
| 2015/0371077 A1* | 12/2015 | Kudo | G06K 9/00067 |
| | | | 382/124 |
| 2016/0063298 A1* | 3/2016 | Tuneld | G06K 9/00013 |
| | | | 348/77 |
| 2016/0203354 A1* | 7/2016 | Choi | G06K 9/00026 |
| | | | 382/124 |
| 2016/0307023 A1* | 10/2016 | Kim | G06K 9/00087 |
| 2016/0314338 A1* | 10/2016 | Li | G06K 9/00 |
| 2016/0350580 A1* | 12/2016 | Pyun | G06K 9/00073 |
| 2017/0004346 A1* | 1/2017 | Kim | G06F 17/30268 |
| 2017/0017825 A1* | 1/2017 | Choi | G06K 9/00026 |
| 2017/0046550 A1* | 2/2017 | Lee | G06K 9/001 |
| 2017/0193272 A1* | 7/2017 | Kim | G06K 9/00087 |
| 2017/0344796 A1* | 11/2017 | Zhang | G06K 9/00087 |

* cited by examiner

FIG.1(A)
FIG.1(B)
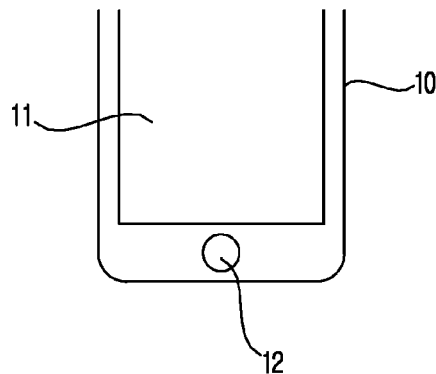
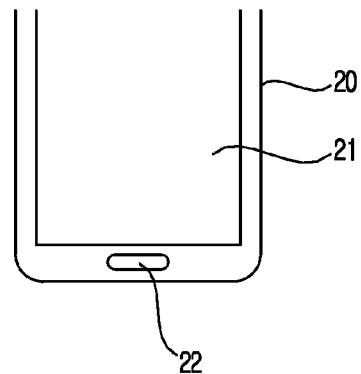
FIG.2
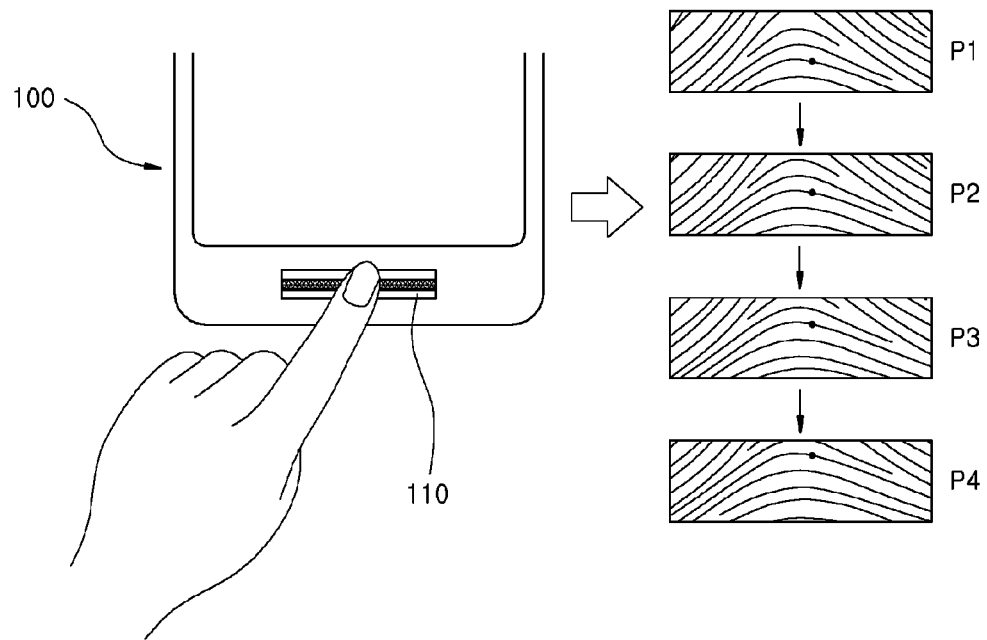

FINGERPRINT IMAGE WITHOUT MINUTIAE
(b)

FINGERPRINT IMAGE
(a)

FIG.6

| 3 | 5 | 2 | 1 | 3 | 8 | 9 | 4 |
|---|---|---|---|---|---|---|---|
| 2 | A 1 | 3 | 10 | B 9 | 5 | 1 | 2 |
| 7 | 4 | 6 | 13 | 6 | 2 | 7 | 6 |
| 5 | 10 | 9 | 17 | 14 | 6 | 10 | 4 |
| 8 | C 13 | 15 | 4 | D 10 | 2 | 12 | 7 |
| 2 | 9 | 11 | 6 | 8 | 5 | 4 | 9 |
| 0 | 7 | 5 | 9 | 4 | 3 | 1 | 0 |
| 1 | 2 | 3 | 8 | 5 | 11 | 13 | 6 |

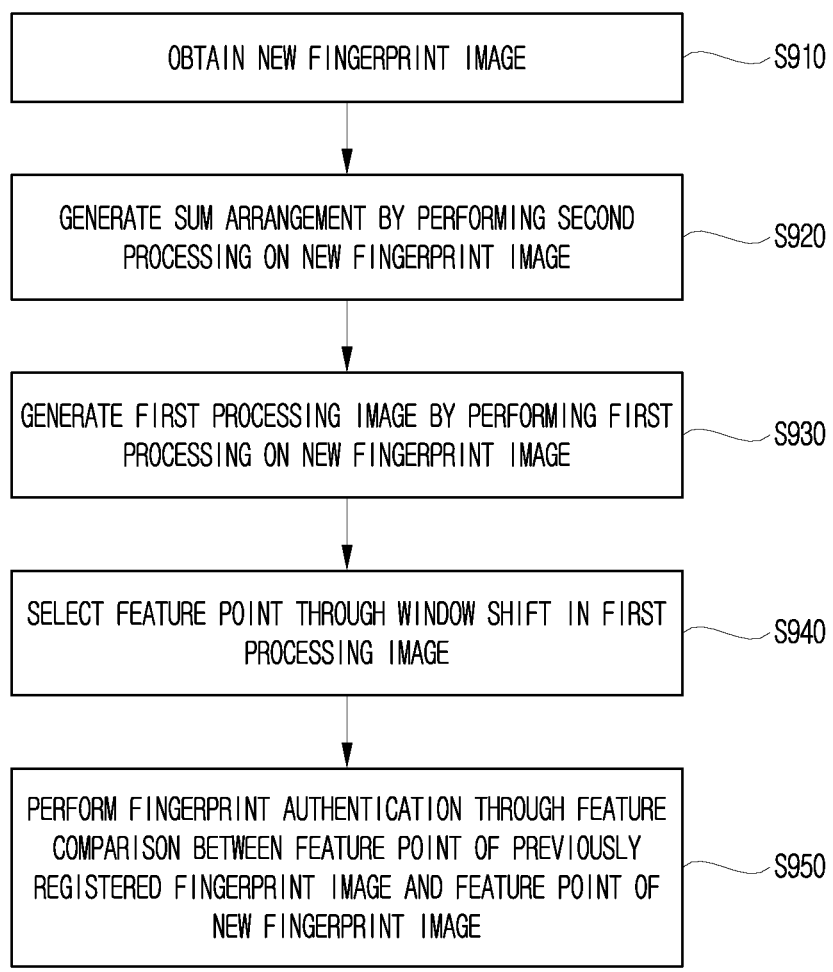

FINGERPRINT INFORMATION PROCESSING METHOD AND APPARATUS FOR SPEED IMPROVEMENT OF FINGERPRINT REGISTRATION AND AUTHENTICATION

CROSS-REFERENCE TO RELATED APPLICATION

This application claims priority to and the benefit of Korean Patent Application No. 10-2015-0141239, filed on Oct. 7, 2015, the disclosure of which is incorporated herein by reference in its entirety.

BACKGROUND

Field

Exemplary embodiments of the present invention relate to a method and apparatus for improving speed of fingerprint registration and authentication, and more particularly, to a method for setting a predetermined region including each pixel configuring a fingerprint image in its center, modifying the fingerprint image by calculating an average value of shading values of pixels in the predetermined region, and selecting a feature point in the modified image.

Discussion of the Background

Since a pattern of a fingerprint is different from individual to individual, fingerprints are mainly being applied to the personal identification field. Particularly, fingerprints are widely being used in various fields such as finance, criminal investigation, security, or the like.

A fingerprint sensor has been developed to identify a person by recognizing his or her fingerprint. The fingerprint sensor is a device for recognizing a fingerprint when a finger of a person touches the fingerprint sensor, and is being used as a means for determining whether a user is valid.

In methods for implementing a fingerprint recognition sensor, there are various well-known methods such as an optical method, a heat detection method, a capacitive method, etc. Among them, a fingerprint recognition sensor of the capacitive method obtains a shape of a fingerprint (a fingerprint pattern) by detecting a change of a capacitance according to a shape of peaks and valleys of the fingerprint when a surface of a finger of a person touches a conductive sensing pattern.

Recently, a mobile device is providing not only a communication function, such as a phone and message transmission service, but also various additional functions in which personal information is utilized for finance, security, etc., and the importance of a need for a locking device of the mobile device has emerged. In order to improve a locking effect of the mobile device, a terminal in which a locking device using fingerprint recognition is installed is being earnestly developed.

FIGS. 1(A) and 1(B) illustrate one example in which a fingerprint sensor is installed in a mobile device, for example, a smart phone.

First, referring to FIG. 1(A), a smart phone 10 includes a display 11 having a function of an input unit in a touch screen method, and a fingerprint sensor 12 is installed below the display 11. The fingerprint sensor 12 is formed in a lower region of a body of the smart phone 10 and is implemented with a home key which moves a screen of the display 11 to a home.

Next, a smart phone 20 shown in FIG. 1(B) also includes a fingerprint sensor 22 installed with a home key below a display 21. A size of the fingerprint sensor shown in FIG. 1(B) is formed to be smaller than that of the fingerprint sensor shown in FIG. 1(A).

Fingerprint detection methods are largely classified as a touch method (or, an area method) and a swipe method, and the touch method is generally applied to the fingerprint sensor 12 shown in FIG. 1(A) and the swipe method is generally applied to the fingerprint sensor 22 shown in FIG. 1(B).

The touch method is a method for obtaining a fingerprint image in a corresponding fingerprint sensing area when a finger is put on the fingerprint sensor 12 for a predetermined time. Meanwhile, the swipe method is a method for obtaining a complete fingerprint image by combining fragmentary fingerprint images as a single image after reading the fragmentary fingerprint images by the fingerprint sensor 22 sensing a fingerprint moving on the fingerprint sensor 22 when a finger moves on the fingerprint sensor 22 in a sliding manner.

When a fingerprint image is obtained with the above methods, the obtained fingerprint image and a previously registered fingerprint image are compared, whether the two fingerprint images match is determined, and fingerprint authentication is performed according to the determination result. As such, in order to determine whether the two fingerprint images match, points which are features in each of the fingerprint images are extracted, and a comparison of the feature points should be performed.

Accordingly, various algorithms for extracting points which are features in fingerprint images have been developed and improved, and thus accuracy of fingerprint authentication is increasing.

However, in order to increase the accuracy of fingerprint authentication, an amount of computation performed to extract points which are features in a fingerprint image increases, and thus there is a disadvantage in that a time used for fingerprint authentication is increased.

Recently, a need for an algorithm for increasing the accuracy of fingerprint authentication and also performing the fingerprint authentication in a limited time using only limited hardware resources is increasing.

SUMMARY

Exemplary embodiments of the present invention are directed to solving problems of the conventional art.

Exemplary embodiments of the present invention provide a method and apparatus for improving a speed of extracting feature points in a fingerprint image, and effectively performing fingerprint registration and authentication even when using limited hardware resources.

Exemplary embodiments of the present invention also provide a method and apparatus for preventing feature points in a fingerprint image from being intensively distributed in a specific region, and increasing accuracy of fingerprint authentication by allowing the feature points to be relatively uniformly selected in an entire region of the fingerprint image.

An exemplary embodiment of the present invention discloses a fingerprint information processing method of a fingerprint detection device, including: obtaining a fingerprint image; calculating an average value of shading values of pixels in a specific region based on a pixel with respect to each pixel of the fingerprint image, performing a first processing of calculating a sum of average values of shading values of pixels included in an expanded region while gradually expanding the specific region, and generating a first processing image for the fingerprint image using a first processing-performed value on each pixel; and forming a window including a predetermined region in the first processing image and selecting feature points among pixels in a window region while moving the window.

The fingerprint information processing method of a fingerprint detection device may further include: performing fingerprint authentication by comparing the selected feature points and feature points of a previously registered fingerprint.

The gradual expansion of the specific region may further include determining whether to further expand the specific region based on an amount of change of the average value of the shading value changed according to the expansion of the specific region.

The gradual expansion of the specific region may further include, when the specific region reaches a predetermined maximum expansion size, suspending the expansion of the specific region.

The fingerprint information processing method of a fingerprint detection device may further include, after the obtaining of the fingerprint image: generating a sum arrangement through a second processing on the fingerprint image, wherein the generating of the first processing image uses the sum arrangement in a process of calculating the average value of the shading values of the pixels included in the specific region.

The selecting of the feature points may further include, limiting a minimum number or a maximum number of feature points selected among the pixels included in the window region.

The selecting of the feature points may further include, moving the window region so that an overlapping region is not present in the first processing image.

An exemplary embodiment of the present invention also discloses an electronic device, including: a fingerprint sensor configured to obtain a fingerprint image by scanning a fingerprint of a finger; and an information processing device configured to calculate an average value of shading values of pixels in a specific region based on a pixel with respect to each pixel of the fingerprint image, perform a first processing of calculating a sum of average values of shading values of pixels included in an expanded region while gradually expanding the specific region, generate a first processing image for the fingerprint image using a first processing-performed value for each pixel, form a window including a predetermined region in the first processing image, and select feature points among pixels in a window region while moving the window.

The information processing device may determine whether to further expand the specific region based on an amount of change of the average value of the shading value changed according to the expansion of the specific region.

The information processing device generates a sum arrangement through a second processing on the fingerprint image, and uses the sum arrangement in the process of calculating the average value of the shading values of the pixels included in the specific region.

An exemplary embodiment of the present invention also discloses a computer program stored in a medium for executing a method including: obtaining a fingerprint image; calculating an average value of shading values of pixels in a specific region based on a pixel with respect to each pixel of the fingerprint image, performing a first processing of calculating a sum of average values of shading values of pixels included in an expanded region while gradually expanding the specific region, and generating a first processing image for the fingerprint image using a first processing-performed value on each pixel; and forming a window including a predetermined region in the first processing image, and selecting feature points among pixels in a window region while moving the window.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which:

FIG. 1(A) and FIG. 1(B) are diagrams illustrating an example in which a fingerprint sensor is installed in a mobile phone, for example, a smart phone.

FIG. 2 is a diagram for describing an operation of obtaining a fingerprint image according to an exemplary embodiment of the present invention.

FIG. 6 is a diagram for describing a method in which a second processing is performed on a fingerprint image in a feature point extraction operation according to an exemplary embodiment of the present invention.

FIG. 9 is a flowchart for describing a fingerprint authentication operation according to an exemplary embodiment of the present invention.

DETAILED DESCRIPTION OF THE ILLUSTRATED EMBODIMENTS

Figure 3:
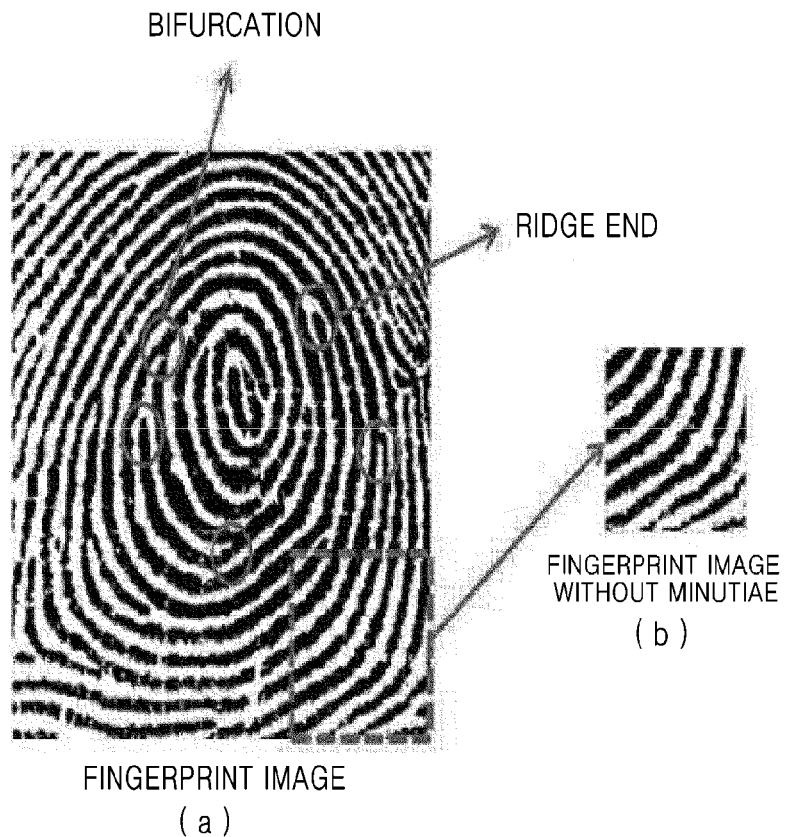
FIG. 3 is a diagram illustrating an example of a fingerprint image obtained by an electronic device.

Hereinafter, the present invention will be described with reference to the accompanying drawings. The present invention may be implemented in various forms, and accordingly, is not limited to embodiments described herein. In order to clearly describe the present invention, a description of a portion which is not related to the present invention will be omitted, and throughout the specification, like reference numerals represent like components.

Throughout the specification, it should be understood that when an element is referred to as being "connected" or "coupled" to another element, it can be directly connected or coupled to the other element or intervening elements may be present. Further, it should be understood that the terms "comprises," "comprising," "includes," and/or "including," when used herein, do not preclude one or more other components and further include one or more components unless stated otherwise.

Hereinafter, exemplary embodiments of the present invention will be described in detail with reference to the accompanying drawings.

As described above, a fingerprint detection method of a touch method is performed in a manner in which a fingerprint image of a corresponding region is obtained by a fingerprint sensor when a user puts his or her finger on a fingerprint sensor.

Meanwhile, in a swipe method, a fingerprint image may be obtained using a principle shown in FIG. 2.

In detail, as shown in FIG. 2, when the user places his or her finger on a fingerprint sensor 110 located in a lower region of an electronic device 100 and moves his or her finger in a sliding manner, partial fragment images P1 to P4 may be continuously obtained.

That is, the fingerprint images of the user are fragmented but are sequentially obtained in a consecutive form. The fragmented fingerprint images P1 to P4 obtained by the fingerprint sensor 110 may be combined as a single fingerprint image so that a complete fingerprint image is obtained.

FIG. 3 is a diagram illustrating an example of a fingerprint image obtained by the electronic device 100.

Referring to FIG. 3, the fingerprint image may include ridges and valleys of the fingerprint, and various pattern matching methods such as a minutiae method of comparing a previously registered fingerprint image and a new fingerprint image through feature points such as bifurcations, ridge ends, etc. of the fingerprint are being used to recognize the fingerprint image. Further, a method of generating a modified image by performing filtering on the obtained fingerprint image and searching for a specific point in the modified image is also being used. In order to search for the specific point in the fingerprint image, various well-known algorithms for performing object recognition in the image are being used, but since a large amount of computation is required in an operation of implementing the algorithm, much performance of hardware resources of the electronic device 100 in which the fingerprint detection device is installed are used, and thus there may be a disadvantage in that a time used for performing fingerprint registration and recognition is increased when the performance of the electronic device 100 does not reach a predetermined level or more.

Figure 4:
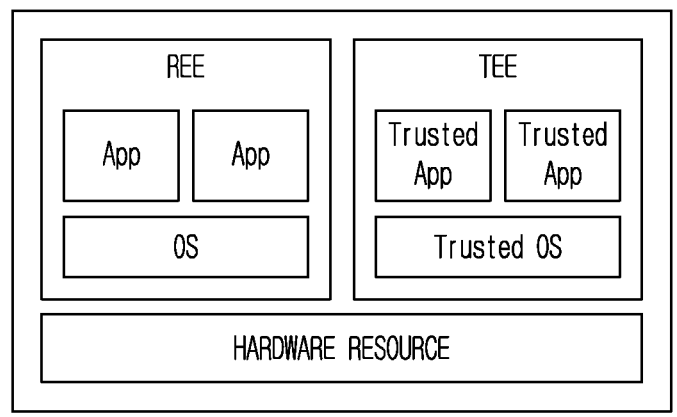
FIG. 4 is a block diagram which briefly classifies a system environment in which an electronic device operates.

FIG. 4 is a block diagram which briefly classifies a system environment in which the electronic device 100 operates.

An operating environment of a system implemented by various kinds of hardware included in the electronic device 100 may be largely divided into a rich execution environment (REE) region and a trusted execution environment (TEE) region.

The REE region may be an environment in which every function of the hardware included in the electronic device 100 is useable, and may be an environment in which an operating system (OS) operating in the electronic device and programs, such as various applications operating in the electronic device, operate.

The TEE region may be an environment in which only a limited portion of hardware resources included in the electronic device 100 is useable, and according to an exemplary embodiment, only the OS and programs whose reliability is authenticated may be operated in the TEE region. When looking at a meaning of only the limited portion of the hardware resources being used in the TEE region in more detail, the programs operating in the TEE region may use only a portion of functions of a central processing unit (CPU) of the electronic device 100, and thus a computational time may be increased when a computation of a predetermined load or more is performed. Further, since the programs operating in the TEE region may use only a memory having a limited size, the programs requiring data which is a predetermined size or more may not operate in the TEE region.

The fingerprint recognition algorithm proposed in the exemplary embodiments may be designed to operate in the TEE region, and thus, may be designed to maximally decrease computations needed for operation since only limited hardware resources are useable.

Figure 5:
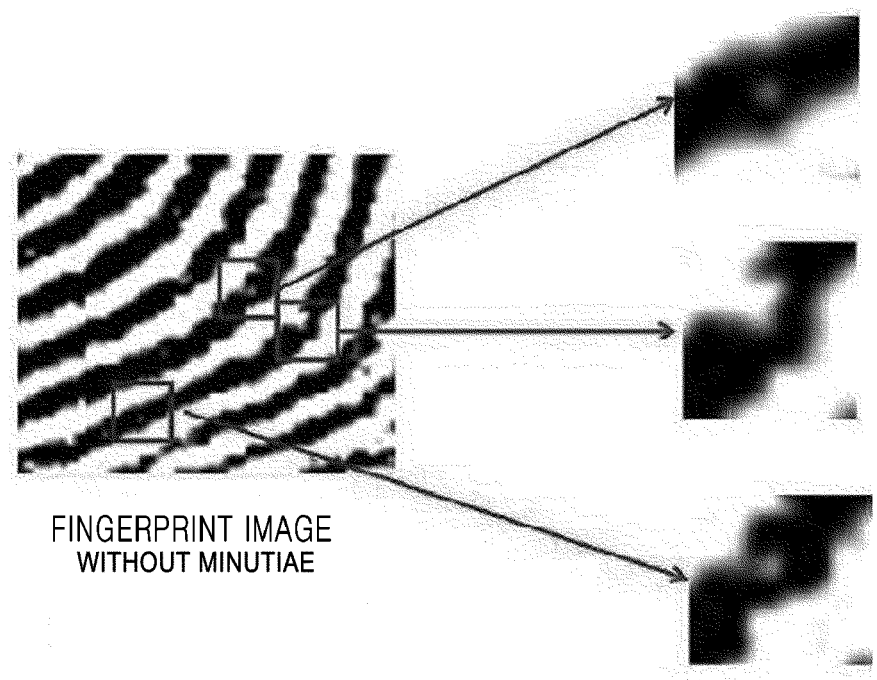
FIG. 5 is a diagram for describing a method for extracting a feature point in a fingerprint image in which there is no general minutiae according to an exemplary embodiment of the present invention.

FIG. 5 is a diagram for describing a method for extracting a feature point in a fingerprint image in which there is no general minutiae according to an exemplary embodiment of the present invention.

Referring to FIG. 5, since a ridge is simply arranged in a specific direction in the fingerprint image, there may not be minutiae such as bifurcation and a ridge end. However, when enlarging the fingerprint image, it may be seen that the ridge does not have uniform thickness and has a specific shape. For example, a specific point of the ridge may protrude outward or may be concave inward, and a hole may be formed in the center of the ridge by a pore.

Features of the fingerprint image may be detected by recognizing a difference between a shading change value and an average change value in the fingerprint image. That is, in FIG. 4, whether there is a specific point may be confirmed based on how much a shading change value in a region in which features appear or a peripheral region thereof is abruptly changed compared to the average change value.

For example, the shading change value in an image of ridges arranged at a uniform thickness may not leave a predetermined range based on the average change value, but the shading change value may be increased at a corresponding position when there is a protruding point or a concave point in the ridge or a pore is formed.

Hereinafter, in the present invention, the feature point of the fingerprint may be a point detected based on a shading change value in a region in which features appear or in a peripheral region thereof.

FIG. 6 is a diagram for describing a method in which a second processing is performed on a fingerprint image in a feature point extraction operation according to an exemplary embodiment of the present invention.

In more detail, referring to FIG. 6, a shading value of each pixel configuring the fingerprint image may be temporarily stored in a memory in an N×M matrix form. An original form of the fingerprint image which is temporarily stored may be deleted in the memory after the extraction of feature points is completed. According to an exemplary embodiment, a sensor array of the fingerprint detection device included in the electronic device 100 may be configured as fingerprint sensor devices arranged in the N×M matrix form, and the shading value of each pixel may be determined according to information recognized by each fingerprint sensor device.

According to an exemplary embodiment, a position of the shading value of each pixel which is temporarily stored in the matrix form in the memory may be configured to equal that of each pixel configuring the fingerprint image.

In FIG. 6, a matrix in which a shading value of an 8×8 sized fingerprint image is stored is illustrated as an example, but the scope of the present invention is not limited thereto.

The electronic device 100 of the present invention may perform a second processing in a feature point candidate detection operation for fingerprint recognition. When the second processing is performed on a specific fingerprint image, a number arrangement corresponding to the corresponding fingerprint image may be generated.

The number arrangement may be configured by the same number as the number of pixels configuring the fingerprint image, and may be generated according to a rule determined by adding shading values of the pixels included in a portion configuring the fingerprint image. Hereinafter, for convenience of explanation, the number arrangement generated by performing the second processing on the specific fingerprint image may be referred to as a "sum arrangement." The sum arrangement for the fingerprint image of the N×M matrix form may also be generated in the N×M matrix form.

When looking at an operation of generating the sum arrangement configured in the matrix form as an exemplary embodiment, a value of a fifth row and third column in the sum arrangement may be calculated as a value obtained by adding values from a first row and first column to the fifth row and third column shown in FIG. 6. According to this method, a sum of every value in the matrix shown in FIG. 6 may be a value of an eighth row and eighth column in the sum arrangement generated by this method.

In the method in which the electronic device 100 generates the sum arrangement corresponding to the fingerprint image through data having the matrix form in which the shading values of the fingerprint image pixels are stored, a value of the sum arrangement which is previously calculated may be used. For example, a value of a third row and sixth column in a specific sum arrangement generated through the matrix shown in FIG. 6 may be calculated by subtracting a value of a second row and fifth column from a value obtained by adding a value of a third row and fifth column and a value of a second row and sixth column, and adding the subtracted value and a value of the third row and sixth column shown in FIG. 6. According to this method, the values configuring the sum arrangement may be calculated without performing a lot of addition operations that are described above.

The electronic device 100 of the present invention may rapidly process a sum of the shading values of the specific region of the pixels of the fingerprint image shown in FIG. 6 in a short time using the sum arrangement generated by the method.

For example, assuming that a sum of shading values included in a region D in the data having the matrix form shown in FIG. 6 is calculated, the sum of the shading values included in the region D may be calculated by subtracting a sum of shading values up to a point b and a sum of shading values up to a point c from a sum of shading values up to a point d, and adding the subtracted value and shading values up to a point a. That is, a sum of the shading values of pixels included in the region D shown in FIG. 6 may be obtained by subtracting a value of a sixth row and second column and a value of a second row and sixth column from a value of a sixth row and sixth column of the sum arrangement generated in FIG. 6, and adding the subtracted value and a value of a second row and second column. As such, the sum of the shading values of the specific region in the fingerprint image may be calculated using only two subtraction and one addition operations by using the sum arrangement which is previously generated for the specific image. Accordingly, since only the addition and subtraction operations are used without complex computations such as multiplication or division operations by using the sum arrangement, a speed may be improved by not using unnecessary hardware resources when performing fingerprint recognition.

Figure 7:
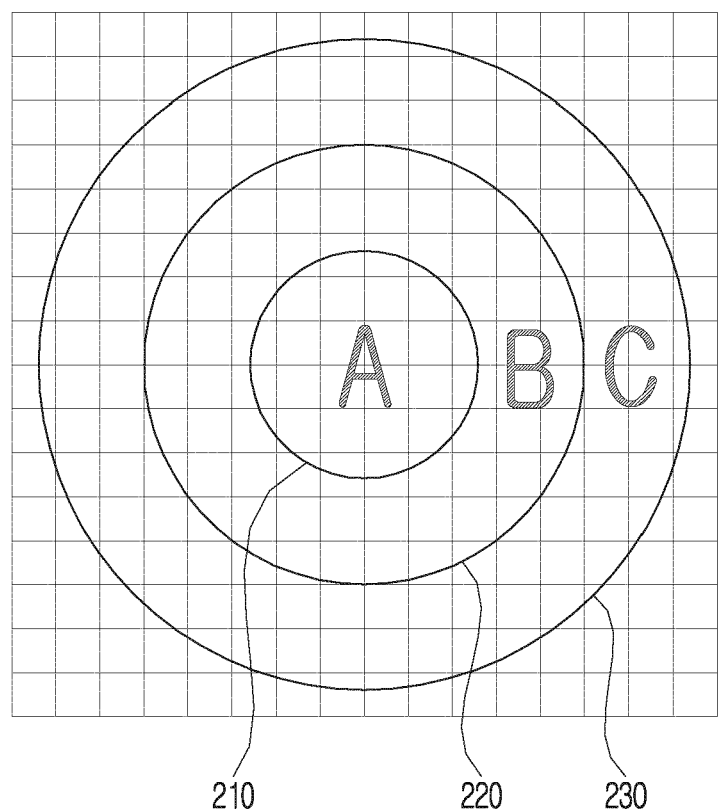
FIG. 7 is a diagram for describing a method in which a first processing is performed on a fingerprint image in a feature point extraction operation according to an exemplary embodiment of the present invention.

FIG. 7 is a diagram for describing a method in which a first processing is performed on a fingerprint image in a feature point extraction operation according to an exemplary embodiment of the present invention.

As described above, the shading value of each pixel configuring the fingerprint image obtained by the electronic device 100 may be temporarily stored in the N×M matrix form.

When a first processing is performed on the obtained fingerprint image, a value for each pixel after the first processing is performed may be calculated and stored as data having the matrix form which is the same size as the fingerprint image.

When looking at a method of performing the first processing on the shading value of each pixel, first, an average value of shading values in a peripheral specific region of one pixel may be calculated, the average value of the shading values may be calculated while gradually expanding the specific region, and a first processing value for each pixel may be calculated using a final value obtained by adding the average value.

When looking at an operation of calculating the first processing-performed value for a specific pixel shown in FIG. 7 as an example, the specific pixel may be present in centers of a region A 210 including a corresponding pixel, a region B 220 including the region A 210, and a region C 230 including the region B 220. The number of pixels present in each region may be increased by being expanded from the region A 210 to the region B 220, and from the region B 220 to the region C 230.

According to an exemplary embodiment, in an operation in which the first processing is performed on the specific pixel, a first processing-performed value for a corresponding pixel may be calculated by adding an average value of shading values of pixels included in the region A 210, an average value of shading values of pixels included in the region B 220, and an average value of shading values of pixels included in the region C 230.

As described above, when calculating the average value of the shading values of the pixels included in each of the regions in the first processing operation, the sum arrangement which is previously generated through the second processing operation may be used. As described above with reference to FIG. 6, when the sum arrangement is used in the operation of calculating the sum of the shading values of the pixels present in the specific region, a desired value may be rapidly calculated using only a few hardware resources by only addition and subtraction operations.

In the operation described above, when the pixel configuring the fingerprint image is located at an edge of the fingerprint image, the pixel may not be present in a predetermined portion in a region configured based on a corresponding pixel. In this case, an average value of the shading values of each of the regions may be calculated in a method of calculating the average value of the shading values by considering only the number of pixels present in the corresponding region.

When looking at an operation of calculating a first processing-performed value for the specific pixel in the fingerprint image according to another exemplary embodiment, a different weight value may be applied to the average value of each region shown in FIG. 7. For example, five times the weight value may be applied to the average value of the region A 210, three times the weight value may be applied to the average value of the region B 220 which is expanded by one step, and a small weight value may be applied to the average value of the region C 230. As such, the reason for applying a greater weight to the average value of an inner region is to prevent an excessive difference between the average value of the shading values and the shading value of the pixel located in the center from occurring as the region of calculating the average value expands. When applying the weight value as described above, a values obtained by applying different weight values to each of the average values of the shading values of the regions A, B, and C 210 to 230 are added and may be divided by a degree to which the weight value is applied. As described above, when looking at an example in which five times the weight value is applied to the region A 210 and three times the weight value is applied to the region B 220, the first processing-performed value of the specific pixel may be calculated by multiplying the weight value and the average value of the shading values of each of the regions, adding the multiplied average values, and dividing the added value by 8 which is a sum of the degree to which the weight values are applied to every region. In an example of FIG. 7, the method of calculating the first processing-performed value for each region may be expressed by the following Equation.

$$PC = w1 \times \text{Mean}(A) + w2 \times \text{Mean}(B) + w3 \times \text{Mean}(C) \qquad \text{[Equation 1]}$$

In Equation 1, PC represents the first processing-performed value for the specific pixel, and Mean(A), Mean(B), and Mean(C) represent the average values of the shading values of the pixels included in the regions A, B, and C, respectively. Further, w1, w2, and w3 represent the weight value applied to the regions, respectively, and according to an exemplary embodiment, a relation of w1>w2>w3 may be formed since the weight value of an inner region is set to be great as described above. In this case, w1, w2, and w3 may be an integer value which is 0 or more. After this, the first processing-performed value calculated by the method may be used to extract a feature point by being comparing with a threshold value which is previously determined.

Since a shape of a fingerprint of a person is formed in an oval shape having little eccentricity, according to an exemplary embodiment of the present invention, an average value of shading values of pixels present in a region of a concentric circle formed based on the specific pixel which is a target for calculating the first processing-performed value may be calculated and used while expanding the concentric circle. As a result, a first processing-performed value calculated for each pixel may be suitably obtained for fingerprint analysis.

Further, in the present invention, a shape of a region which is arbitrarily determined in the operation of calculating a first processing-performed value for a shading value of each pixel may not be limited to the concentric circle described above, and may be implemented in various shapes such as a modified round shape such as an oval, a polygonal shape, etc.

According to an exemplary embodiment of the present invention, in the operation of calculating a first processing-performed value for the shading value of the specific pixel, when calculating an average value for a predetermined peripheral region of the corresponding pixel and gradually expanding the predetermined peripheral region, whether to additionally expand the region may be determined based on a result obtained by calculating average values of previous regions.

In FIG. 7, when explaining the operation of calculating the first processing-performed value for the specific pixel of the fingerprint image as an example, the average value of the shading values of the pixels included in the regions A and B 210 and 220 may be calculated first, and whether to calculate the average value of the region C 230 may be determined by comparing the calculated average values.

According to an exemplary embodiment, when the average value of the specific region is equal to or more than an average value of a previous region or decreased value obtained by comparing the average value of the specific region with the average value of the previous region is equal to or less than a reference value which is previously determined, an average value for a subsequent region may be calculated by additionally expanding the region. Conversely, when the decreased value obtained by comparing the average value of the specific region and the average value of the previous region is the reference value which is previously determined or more, the first processing-performed value for the shading value of the specific pixel may be calculated using the average values of the regions calculated at a corresponding time without calculating the average value while additionally expanding the region.

In the example of FIG. 7, even when the average value of the shading values included in the region A 210 are confirmed to be greater than or smaller than the average value of the shading values included in the region B 220 by comparing the average value of the shading values of the pixels included in the region A 210 and the average value of the shading values of the pixels included in the region B 220, the average value of the shading values included in the region C 230 which is expanded instead of the region B 220 may be used to calculate the first processing-performed value when a difference between the two average values is the threshold value which is previously determined or less. After this, whether to calculate an average value of the shading values of the pixels included in a region D (not shown) expanded from the region C 230 may be determined by comparing the average value of the shading values of the pixels included in the region B 220 and the average value of the shading values of the pixels included in the region C 230.

According to the method described above, a region may be gradually expanded based on the specific pixel which is a target for calculating the first processing-performed value, and whether to additionally expand the region based on the specific pixel may be determined according to a result obtained by comparing an average value of shading values of pixels of a predetermined region at a specific time and an average value of shading values of the pixels of the predetermined region right before the specific time in the operation of calculating an average value of shading values of pixels included in each region.

As such, whether to additionally expand the specific region may be determined by an amount of change of the average value of the shading values of the pixels included in the specific region which is gradually expanded in the fingerprint image, and according to an exemplary embodiment, when the specific region reaches a maximum expansion size, since the maximum expansion size of the specific region is predetermined, the expansion of the specific region may be suspended regardless of the amount of change of the average value of the shading values of the pixels.

When looking at a fingerprint image of an average person, the fingerprint image may have a shape in which a ridge and a valley rotate in an oval shape. According to an exemplary embodiment, when a region including a plurality of pixels corresponding to the valley appears while a region in which an average value of shading values of the pixels is calculated is expanded, since an average value of a corresponding region is smaller than that of a previous region, the expansion of the region may be suspended, and the first processing-performed value may be calculated using a region in which the expansion is currently completed or an average value of shading values of pixels calculated in a previous region, and thus the first processing-performed value suitable for analysis of the fingerprint shape of the person may be calculated using the method described above.

In exemplary embodiments of the present invention, the method described above may be applied to each of the pixels configuring the fingerprint image and the first processing-performed value may be calculated, and thus data having the matrix form of the same size as data having the matrix form storing the shading value of each pixel of the fingerprint image may be obtained and stored in the memory of the electronic device 100. Hereinafter, a distorted image formed through a set of first processing-performed values calculated for one fingerprint image may be referred to as a "first processing image."

Figure 8A:
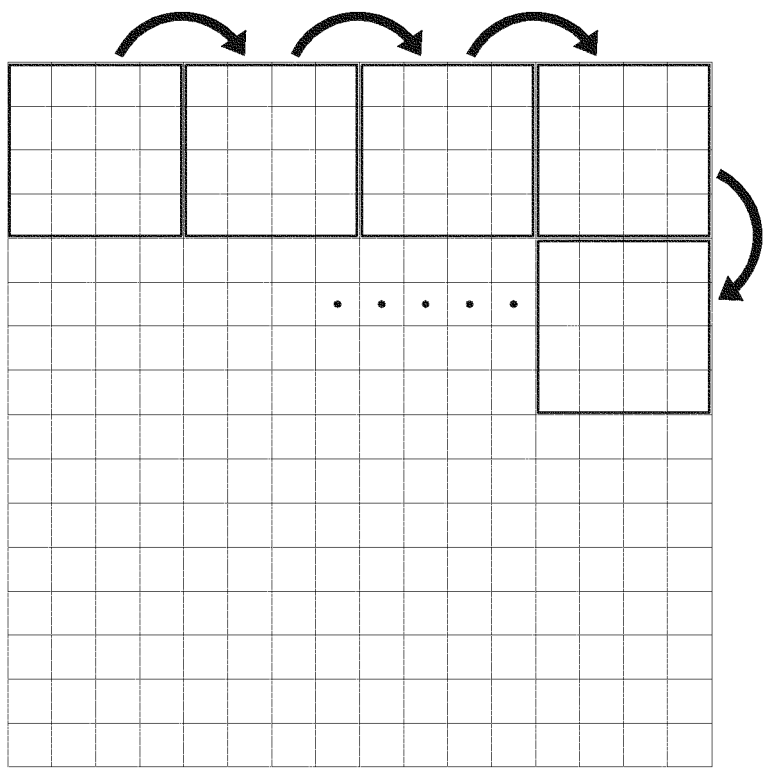
FIG. 8(A) and FIG. 8(B) are diagrams for describing a method for selecting a feature point for performing a fingerprint recognition operation in a first processing image according to an exemplary embodiment of the present invention.
Figure 8B:
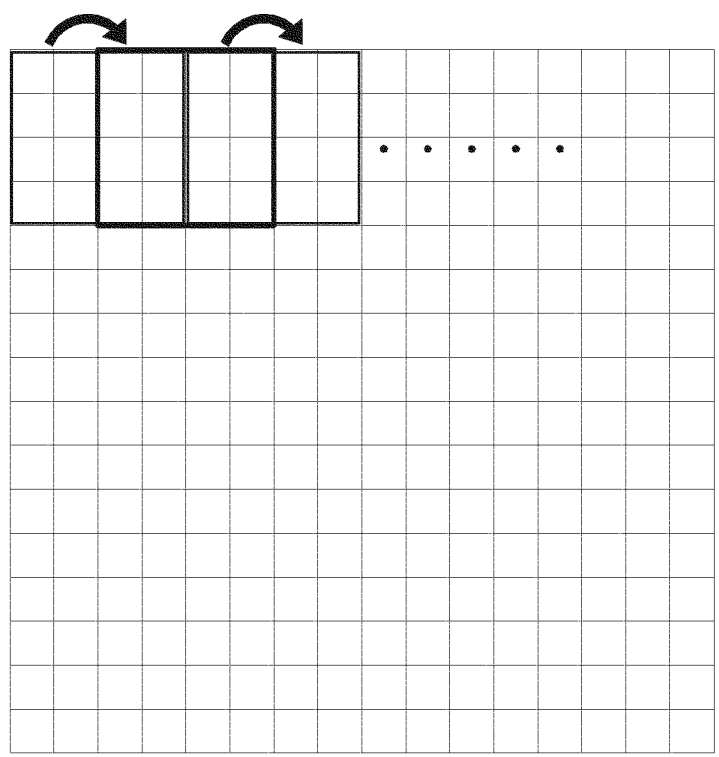

FIG. 8(A) and FIG. 8(B) are diagrams for describing a method for selecting a feature point for performing a fingerprint recognition operation on a first processing image according to an exemplary embodiment of the present invention.

Referring to FIGS. 8(A) and 8(B), a window having a predetermined size, including a plurality of pixels in a first processing image, may be set, shading values of the pixels present in a window region may be analyzed, and feature points in a corresponding region may be selected.

According to an exemplary embodiment, when looking at an operation of selecting feature points in a region of a single window, a shading value of each pixel and shading values of its peripheral pixels may be compared in the first processing image, and a corresponding pixel may be selected as a feature point when a difference which is a predetermined value or more is generated. In this operation, the number of feature points selected in the region of the single window may be predetermined, when the number of pixels satisfying a feature point selection standard is greater than the predetermined number, only the predetermined number of pixels may be selected as feature points by the pixels competing with each other. That is, only the predetermined number of pixels or less may be selected as the feature points in the region of a single window. A competition operation may be performed by scoring each pixel located in the region of the window, and only the predetermined number of pixels may be selected as the feature points by selecting in the order of greatest score.

According to another exemplary embodiment, a minimum number of pixels selected as the feature points may also be predetermined together with a maximum number of pixels selected as the feature points in the region of a single window. In this case, the minimum number or the maximum number of the pixels may be variously set according to a security level of the fingerprint recognition or a characteristic of the fingerprint recognition device. As such, when only less pixels than the minimum number of pixels selected as the feature points in the region of a single window satisfy the feature point selection standard, the feature point may be further selected among pixels which do not satisfy the feature point selection standard. As described above, this operation may be performed by scoring each pixel in the region of the window and selecting the number of pixels lacking as the feature point according to the order of having a great score.

According to an exemplary embodiment, a positional relation of the feature points may be limited even in the region of one window. For example, when positions of pixels selected as the feature points among pixels present in a region of a window are dense, a minimum separation distance between pixels selected as the feature points in the region of a single window may be set since it is difficult to perform fingerprint authentication afterwards.

Hereinafter, a method of moving a window which is a reference region for setting a feature point in a single first processing image will be described. Hereinafter, the movement of the window in the first processing image may be referred to as a "shift."

According to an exemplary embodiment, a method in which a window is shifted may mean that the window is shifted to not overlap a previous window region, as shown in FIG. 8(A). In order to select a feature point for an entire region of the first processing image using the method described above, the entire region of the fingerprint image may be divided into a predetermined number of non-overlapping window regions, and feature points for each window may be selected.

According to another exemplary embodiment, the window may be shifted in the window region which is determined first using a predetermined standard, the shift of the window may be performed until the entire region of the first processing image is included in the window region shifted at least one time. Referring to FIG. 8(B), when the shift of the window region is performed, there may be an overlapping region in each window. In FIG. 8Bb), when the selection of the feature points among the pixels present in one window region is completed, the shift of the window may be performed, the feature points may be selected among the pixels present in the shifted window region, and in this case, there may be feature points selected in the window region before the shift is performed in the window region in which the shift is performed. In this case, the window region in which the shift is performed may be divided into a region in which the selection of the feature points is completed and a region in which the selection of the feature points is not completed, a feature point may not be further selected in the region in which the selection of the feature points is completed, and may be further selected only in the region in which the selection of the feature points is not completed. Further, as described above, the maximum number of feature points selected in one window may be limited.

The electronic device 100 of the exemplary embodiments of the present invention may store the feature points selected through the operation described above in the fingerprint image obtained by the fingerprint detection device, and whether the fingerprint images match may be determined by comparing the feature points in the fingerprint image with feature points selected in a newly obtained fingerprint image.

According to an exemplary embodiment, feature points may be selected in a fingerprint image, information related to the feature points may be stored in the memory, and after this, an original fingerprint image which is temporarily stored in the memory, a sum arrangement generated through the second processing, and a first processing image may be deleted.

The feature points selected in the first processing image through the operation described above may be further selected through an additional algorithm afterwards, and in this case, the feature points selected through the operation described above may be used as a feature point candidate group.

FIG. 9 is a flowchart for describing a fingerprint authentication operation according to an exemplary embodiment of the present invention.

First, when a finger touches a fingerprint sensor for fingerprint authentication, the fingerprint sensor may start to obtain a fingerprint image by sensing the touch of the finger (S910). The fingerprint image may be obtained in the method described above with reference to FIG. 2.

The second processing may be performed on a corresponding fingerprint image when the fingerprint image is obtained, and a sum arrangement for the fingerprint image may be generated (S920). In the same method as described above with reference to FIG. 6, a sum of a value of each pixel of the corresponding fingerprint image may be calculated, and a sum arrangement having the same size as data having a matrix form in which pixels configuring the fingerprint image are stored may be generated.

After this, the first processing may be performed on the fingerprint image, and a first processing image may be generated on an obtained new fingerprint image (S930). In the same method as described above with reference to FIG. 7, a first processing-performed value for each pixel may be obtained in a method of summing an average value of shading values of each region calculated while gradually expanding a predetermined region based on each pixel, and the first processing image may be generated by performing the same operation on all of the pixels configuring the fingerprint image. In this operation, the sum arrangement generated in operation S920 may be used, and thus a calculation speed may be dramatically improved compared to a case in which the sum arrangement is not used.

After the first processing image on the obtained new image is generated, feature points for the entire first processing image may be selected in a method of selecting the feature points in each window while shifting the window in the first processing image (S940). That is, in the same method as described with reference to FIG. 8, the feature points for the first processing image may be selected, and the maximum number of feature points selected in each window region shifted in this operation may be limited. When all of the pixels in the first processing image are included in the window which is shifted at least one time, the feature point selection operation may be completed.

After this, a similarity between a previously registered fingerprint and the obtained new fingerprint may be calculated by comparing feature points of the previously registered fingerprint image and the feature points of the obtained new fingerprint image, whether the fingerprints match may be determined through their similarity, and fingerprint authentication may be performed (S950). When the fingerprint authentication is performed, an operation which a user wants to perform may be performed in the electronic device 100.

According to an exemplary embodiment of the present invention, the feature points in the first processing image obtained through the first processing performed using only the average value of the shading values of pixels included in the specific region may be selected without using an algorithm that requires slightly higher hardware performance, and computational operations may be maximally decreased since the sum arrangement generated by the second processing is used when applying the first processing to the obtained fingerprint image, and thus the fingerprint authentication operation may be rapidly performed even when a fingerprint detection module operates in the TEE region of the electronic device 100. Further, selected feature point information may be stored in the TEE region and used, and thus the fingerprint authentication may be rapidly performed while economizing hardware resources since a fingerprint image which is initially obtained through the fingerprint sensor and is temporarily stored is deleted in the memory after the first processing or the second processing is completed.

Figure 10:
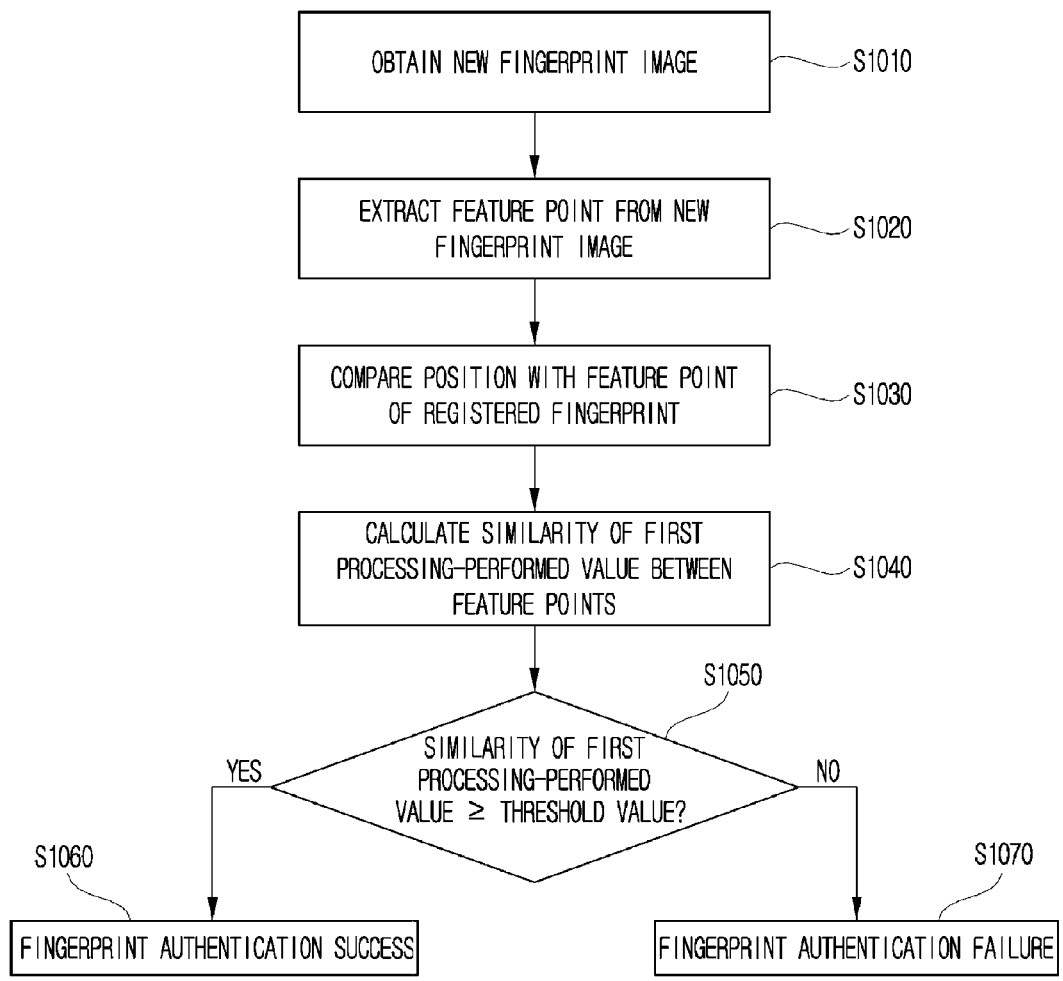
FIG. 10 is a flowchart for describing a fingerprint authentication method according to an exemplary embodiment of the present invention.

FIG. 10 is a flowchart for describing a fingerprint authentication method according to an exemplary embodiment of the present invention.

First, when a finger touches a fingerprint sensor for fingerprint authentication, the fingerprint sensor may start to obtain a fingerprint image by sensing the touch of the finger (S1010). The fingerprint image may be obtained in the method described above with reference to FIG. 2.

When the fingerprint image is obtained, the first processing and the second processing may be performed on the corresponding fingerprint image, and feature points may be extracted based on shading values of a first processing image generated through the first processing (S1020).

One or more pieces of feature point information may be stored and position information of the feature points may be stored as template. The position information of the feature points, that is, a geopolitical position of the feature points and a geopolitical position of feature points of a previously registered fingerprint may be compared, and whether the feature points correspond to any portion of the fingerprint image may be determined (S1030). That is, an operation of finding a portion to be compared between the feature points of the obtained new fingerprint and the feature points of the previously registered fingerprint may be performed. Since the fingerprint image is elastically reduced and expanded in some cases when sensing the fingerprint, an operation of comparing while reducing and expanding a distance to another feature point in a radial form based on a single feature point may be performed.

When a comparison target position between a feature point of the obtained new fingerprint and a feature point of the previously registered fingerprint is selected after operation S1030 is performed, a similarity between first processing-performed values of each of the feature points may be calculated (S1040). The similarity may mean a degree of similarity of a first processing-performed value of a first feature point among the feature points of the previously registered fingerprint and a first processing-performed value of a second feature point among the feature points of the obtained new fingerprint, and may be defined as an absolute value of a difference between the two first processing-performed values.

When the similarity between the first processing-performed values of the feature points is calculated, whether the similarity is a predetermined threshold value or more may be determined (S1050). When the similarity is the threshold value or more, it may be determined that fingerprint authentication is successful (S1060), and if not, it may be determined that the fingerprint authentication has failed (S1070).

Figure 11:
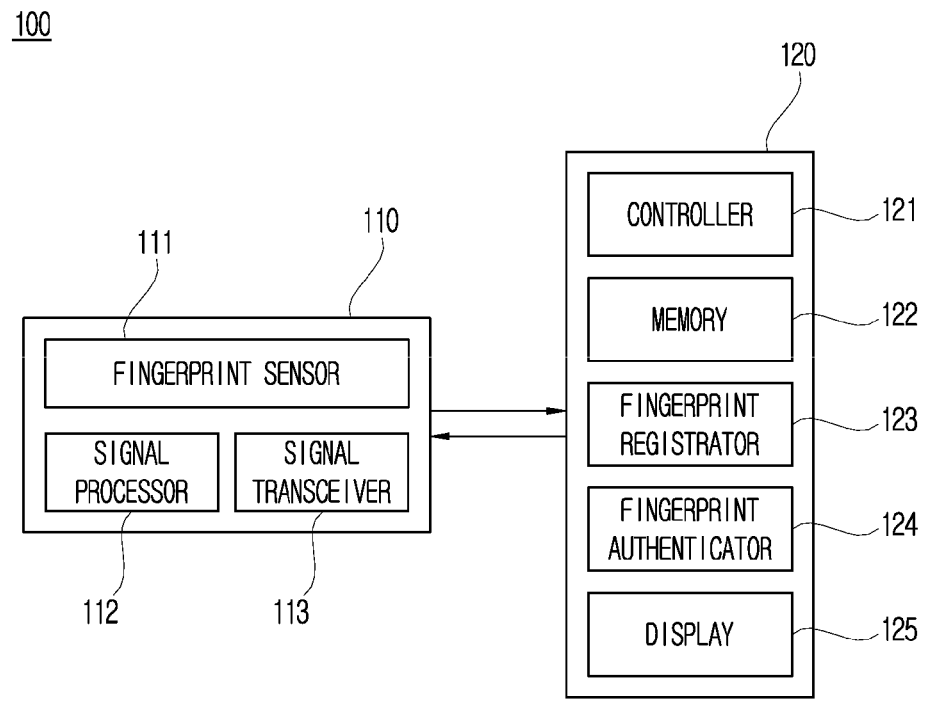
FIG. 11 is a diagram illustrating a configuration of an electronic device including a fingerprint detection device according to an exemplary embodiment of the present invention.

FIG. 11 is a diagram illustrating a configuration of the electronic device 100 including a fingerprint detection device according to an exemplary embodiment of the present invention.

Referring to FIG. 11, the electronic device 100 according to an exemplary embodiment may include a fingerprint sensor 110 and an information processing device 120.

The electronic device 100 according to an exemplary embodiment may be a digital device performing a predetermined operation according to an input of a user, and any digital device capable of performing a computational operation by including a memory and a microprocessor. such as a personal computer (PC), a workstation, a personal digital assistant (PDA) device, a web pad, a mobile phone, a navigation device, etc., may be used as the electronic device 100 of the present invention.

The fingerprint sensor 110 may be formed in a portion of the electronic device 100. As an example, the fingerprint sensor 110 may be located in a front surface of the electronic device 100, but according to various embodiments, it may be formed in side surfaces and a rear surface of the electronic device 100, or a surface of a display 125.

The fingerprint sensor 110 according to an exemplary embodiment may include a fingerprint sensor 111, a signal processor 112, and a signal transceiver 113.

The fingerprint sensor 111 may be a unit which senses a touch of a finger and obtains a fingerprint image by scanning a fingerprint of the touching finger. The fingerprint sensor 111 may scan the fingerprint in various well-known methods such as a capacitive method, an optical method, a pressure method, a heat detection method, etc. According to an exemplary embodiment, the fingerprint sensor 111 may perform fingerprint sensing by mixing the swipe method and the touch method. For example, feature points of a fingerprint may be extracted after obtaining a fingerprint image using the swipe method when registering the fingerprint, and feature points of a fingerprint may be extracted after obtaining a fingerprint image using the touch method when authenticating the fingerprint, or vice versa.

The signal processor 112 may perform signal processing on a fingerprint image frame scanned in a predetermined period (speed) by the fingerprint sensor 111. For example, the signal processor 112 may include an analog circuit, a noise reduction circuit, a signal sensitivity amplification circuit, an analog-to-digital signal converter circuit, a digital circuit, etc. which convert the fingerprint image into an electrical signal. The signal processor 112 may be implemented separately from or integrated with the fingerprint sensor 111 in the form of an application-specific integrated circuit (ASIC).

The signal transceiver 113 may transmit the electrical signal for the fingerprint image, that is, an output signal output from the signal processor 112, to the information processor 120, and receive a signal (for example, a power signal, a control signal, a data signal for a registered fingerprint, etc.) output from the information processor 120. The signal transceiver 113 may use an interface of an inter integrated circuit (I2C) or a serial peripheral interface (SPI).

The information processor 120 may include a controller 121, a memory 122, a fingerprint registrator 123, a fingerprint authenticator 124, and a display 125. For convenience of explanation, the remaining components excluding the fingerprint sensor 110 among the electronic device 100 are illustrated as the information processing device 120, but a configuration of the information processing device 120 is not limited to the components shown, and according to exemplary embodiments, may various components, such as an audio unit, a touch detection unit, etc. may be further included.

The controller 121 may control an overall operation of the fingerprint sensor 110 and the information processor 120.

The memory 122 may temporarily or permanently store feature points of a fingerprint in a template form. Further, the memory 122 may store data and firmware information of the electronic device 100. The memory 122 may be implemented as a volatile memory such as a static random access memory (SRAM) and a dynamic random access memory (DRAM), and a non-volatile memory such as a read only memory (ROM) and a flash memory. An original form of a fingerprint image, a sum arrangement generated through the second processing, and a first processing image generated through the first processing may be temporarily stored in the memory 122.

The fingerprint registrator 123 may extract feature points of a fingerprint image of a finger through the operation described above with reference to FIGS. 6 to 8, and register the extracted feature points as fingerprint information. The registered fingerprint information may be stored in the memory 122.

The fingerprint authenticator 124 may compare the fingerprint information stored in the memory 122 and feature point information of a currently obtained fingerprint image to perform fingerprint authentication.

The fingerprint registrator 123 and the fingerprint authenticator 124 are illustrated as separate components in FIG. 10, but may be integrally implemented as a single module.

The fingerprint registrator 123 and the fingerprint authenticator 124 may be in the form of a program module, and may be stored in a specific region of the controller 121 or the memory 122 in an algorithm form. The fingerprint registrator 123 and the fingerprint authenticator 124 may be encrypted at a high security level, and may be desired to be managed not to permit access to another root, a correction, or an illegal transfer of fingerprint information.

The display 125 may display an operational state of the electronic device 100 or other information. The display 125 according to an exemplary embodiment may display the operational state (for example, information regarding whether registration is successful, information regarding whether authentication is successful, etc.) of the fingerprint registrator 123 and the fingerprint authenticator 124.

Figure 12:
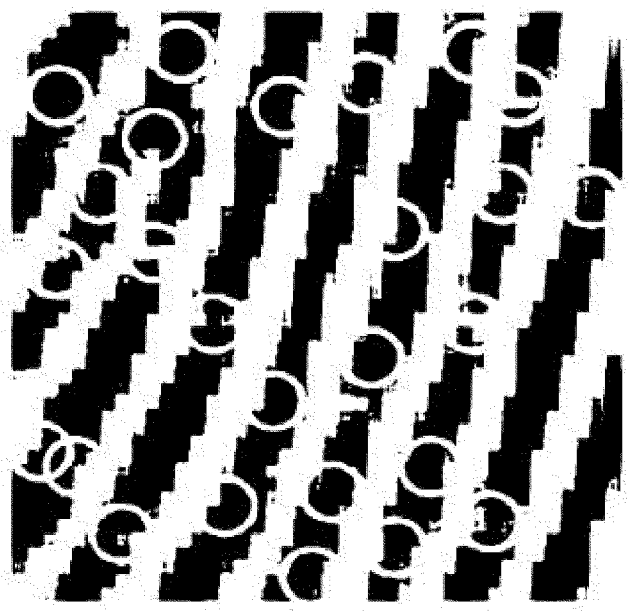
FIG. 12 is a diagram illustrating feature points extracted from a fingerprint image according to exemplary embodiments of the present invention.

FIG. 12 is a diagram illustrating feature points extracted from a fingerprint image according to exemplary embodiments of the present invention.

As shown in FIG. 12, a pixel position having a specific shading difference value with a peripheral pixel in a fingerprint image in which general minutiae (for example, a ridge end, bifurcation, etc.) is not present, that is, feature points are extracted as sufficient number as for fingerprint registration and authentication. The feature points are represented by a circle in FIG. 12.

According to an exemplary embodiment, even when minutiae which is a characteristic of a general fingerprint is not present in the fingerprint image, an intrinsic characteristic of a fingerprint may be extracted by performing the first processing on each image. Accordingly, even when a sufficient number of minutiae is not present in a region of the fingerprint image being obtained, it may be possible to extract intrinsic information and authenticate the fingerprint.

As such, according to exemplary embodiments of the present invention, the electronic device 100 may decrease a time used for fingerprint registration and authentication by using an algorithm which is simpler than a method used in well-known fingerprint authentication algorithms when performing the fingerprint registration and authentication, and thus the fingerprint registration and authentication may be completed within a limited time required by the electronic device 100 even when the fingerprint recognition algorithm operates in a TEE region capable of using only limited hardware resources.

According to an exemplary embodiment of the present invention, distortion using an average value of shading values of pixels configuring a fingerprint image may be applied to the fingerprint image, an amount of computation may be decreased by using a sum arrangement related to the corresponding image which is previously generated in this operation, and a fingerprint authentication algorithm may be efficiently operated even when few hardware resources are usable.

According to an exemplary embodiment of the present invention, when selecting a feature point in a fingerprint image to which distortion is applied, feature points may be uniformly distributed in an entire region of the fingerprint image by limiting the maximum number of feature points selected in a window including a predetermined region, and thus the accuracy of fingerprint authentication may be increased.

The effects of the exemplary embodiments of the present invention are not limited thereto, and it should be understood that every effect inferable from the detailed description and the configuration of the exemplary embodiments of the present invention is included in the present invention.

The exemplary embodiments of the present invention described above can be recorded in a computer-readable recording medium by being implemented in a program instruction form capable of being performed by various computer components. The computer-readable recording medium may include a program instruction, a local data file, a local data structure, etc. alone or in combination. The program instruction recorded in the computer-readable recording medium may be specially designed and be configured for the inventive concept, or may be an instruction which is generally used by those of ordinary skill in the computer software field. Examples of the computer-readable recording medium may include a hardware device which is specially configured to store and execute a program instruction like a magnetic media such as a hard disk, a floppy disk and a magnetic tape, an optical recording media such as a compact disk (CD)-ROM and a digital versatile disk (DVD), a magneto-optical media such as a floptical disk, and a ROM, a RAM, and a flash memory. Examples of the program instruction may include not only machine code made by a compiler but also high-level language code which is executable by a computer using an interpreter or the like. The hardware device may be configured as one or more software modules which perform the operation according to the present invention, and vice versa. The software module may be implemented in the program instruction form capable of being performed by various computer components, and may be recorded in the computer-readable recording medium.

The above description is merely of exemplary embodiments of the present invention, and it should be apparent to those skilled in the art that various modifications can be made to the above-described exemplary embodiments of the present invention without departing from the spirit or the scope of the invention. Accordingly, it should be understood that the exemplary embodiments of the present invention are not intended to limit the scope of the invention but merely to describe the invention. For example, each component described in a single form may be implemented to be separated, and likewise, components described in a distributed form may be implemented to be combined.

The scope of the present invention is defined by the following claims. Thus, it is intended that the present invention covers all such modifications provided they come within the scope of the appended claims and their equivalents.

What is claimed is:

1. A fingerprint information processing method of a fingerprint detection device, comprising:
   obtaining a fingerprint image by a fingerprint detection device;
   calculating an average value of shading values of pixels in first regions of said fingerprint image, a center of each of the first regions is each pixel of the fingerprint image;
   calculating a sum of the average values of shading values of pixels included in an expanded region, wherein the expanded region is defined by gradually expanding the first regions in subsequent specific times, wherein the expanding is suspended when an average value of shading values of pixels of the expanded region at a specific time decreases of at least a predetermined reference value compared to an average value of shading values of the pixels of the expanded region at a time before the specific time;
   generating a first processing image for the fingerprint image using the sum of the average value with respect to the each pixel centered in the each of the first regions; and
   forming a window including a second region in the first processing image, and
   selecting feature points among the pixels in the second region while moving the window.

2. The fingerprint information processing method of a fingerprint detection device of claim 1, further comprising performing fingerprint authentication by comparing the selected feature points and feature points of a previously registered fingerprint.

3. The fingerprint information processing method of a fingerprint detection device of claim 1, wherein the gradual expansion of the first regions further comprises: when the first regions reach a predetermined maximum expansion size, suspending the expansion of the first regions.

4. The fingerprint information processing method of a fingerprint detection device of claim 1, further comprising, after the obtaining of the fingerprint image, generating a sum arrangement through a second processing on the fingerprint image, wherein the generating of the first processing image uses the sum arrangement in a process of calculating the average value of the shading values of the pixels included in the first regions.

5. The fingerprint information processing method of a fingerprint detection device of claim 1, wherein the selecting of the feature points further comprises limiting a minimum number or a maximum number of feature points selected among the pixels included in the second region.

6. The fingerprint information processing method of a fingerprint detection device of claim 1, wherein the selecting of the feature points further comprises moving the second region so that an overlapping region is not present in the first processing image.

7. An electronic device, comprising:
   a fingerprint sensor configured to obtain a fingerprint image by scanning a fingerprint of a finger; and
   an information processing device configured to calculate an average value of shading values of pixels in a first regions of said fingerprint image, a center of the first regions is each pixel of the fingerprint image, calculate a sum of average values of shading values of pixels included in an expanded region, wherein the expanded region is defined by gradually expanding the first regions in subsequent times, wherein the expanding is suspended when an average value of shading values of pixels of the expanded region at a specific time decreases of at least a predetermined reference value compared to an average value of shading values of the pixels of the expanded region at a time before the specific time, generate a first processing image for the fingerprint image using the sum of the average value with respect to the each pixel centered in the each of the first regions, form a window including a second region in the first processing image, and select feature points among pixels in the second region while moving the window.

8. The electronic device of claim 7, wherein the information processing device generates a sum arrangement through a second processing on the fingerprint image, and uses the sum arrangement in the process of calculating the average value of the shading values of the pixels included in the first regions.

9. A computer program stored in a non-transitory computer-readable medium for executing a method comprising:
obtaining a fingerprint image by a fingerprint detection device,
calculating an average value of shading values of pixels in first regions of said fingerprint image, a center of each of the first regions is each pixel of the fingerprint image; calculating a sum of the average values of shading values of pixels included in an expanded region, wherein the expanded region is defined by gradually expanding the first regions in subsequent specific times, wherein the expanding is suspended when an average value of shading values of pixels of the expanded region at a specific time decreases of at least a predetermined reference value compared to an average value of shading values of the pixels of the expanded region at a time before the specific time; and generating a first processing image for the fingerprint image using the sum of the average value with respect to the each pixel centered in the each of the first regions; and
forming a window including a second region in the first processing image, and selecting feature points among the pixels in the second region while moving the window.

* * * * *